US012693662B2

(12) United States Patent
Santangelo et al.

(10) Patent No.: US 12,693,662 B2
(45) Date of Patent: Jul. 28, 2026

(54) LONG DISTANCE TRANS-CONTINENTAL REMOTE DRONE PILOTING SYSTEM

(71) Applicant: UAVPatent Corp., Carson City, NV (US)

(72) Inventors: Giuseppe Santangelo, Troy, MI (US); Lorenzo Rizzello, Troy, MI (US)

(73) Assignee: UAVPatent Corp., Carson City, NV (US)

( * ) Notice: Subject to any disclaimer, the term of this patent is extended or adjusted under 35 U.S.C. 154(b) by 386 days.

(21) Appl. No.: 17/997,651

(22) PCT Filed: May 6, 2021

(86) PCT No.: PCT/US2021/031040
§ 371 (c)(1),
(2) Date: Oct. 31, 2022

(87) PCT Pub. No.: WO2021/226316
PCT Pub. Date: Nov. 11, 2021

(65) Prior Publication Data
US 2023/0288923 A1     Sep. 14, 2023

Related U.S. Application Data

(60) Provisional application No. 63/020,546, filed on May 6, 2020.

(51) Int. Cl.
*G05D 1/00* (2024.01)
*B64U 10/00* (2023.01)
(Continued)

(52) U.S. Cl.
CPC ........... *G05D 1/0016* (2013.01); *B64U 10/00* (2023.01); *G05D 1/101* (2013.01);
(Continued)

(58) Field of Classification Search
CPC ...... G05D 1/0016; G05D 1/101; G05D 1/226; G05D 1/2247; B64U 10/00; B64U 2101/20; B64U 2101/30; B64U 2201/20
See application file for complete search history.

(56) References Cited

U.S. PATENT DOCUMENTS 9,927,807 B1    3/2018 Ganjoo
11,328,510 B2 *   5/2022 Nguyen ................. G06V 20/41
(Continued)

FOREIGN PATENT DOCUMENTS

WO      WO-2016161426 A1 * 10/2016

OTHER PUBLICATIONS

International Search Report and Written Opinion in PCT App. No. PCT/US3031/031040 (filed May 6, 2021), mailed Jul. 13, 2021.
(Continued)

*Primary Examiner* — Anne Marie Antonucci
*Assistant Examiner* — Esam Almadhrhi

(57)      ABSTRACT

A remote drone control system includes a pilot endpoint system comprising a pilot endpoint and a controller connected to the pilot endpoint. The remote drone control system includes a control endpoint system including a control endpoint, a signal adaptor connected to the control endpoint, and a transmitter connected to the signal adaptor. A drone is arranged to communicate with the transmitter to receive and send drone operating data to the control endpoint system. The drone is also arranged to communicate drone video data to the control endpoint system. A remote bridge including a server is arranged to connect the pilot endpoint and the control endpoint such that data is communicated amongst the pilot endpoint, control endpoint, and drone in real-time.

18 Claims, 9 Drawing Sheets

(51) Int. Cl.
B64U 101/20 (2023.01)
B64U 101/30 (2023.01)

(52) U.S. Cl.
CPC ...... *B64U 2101/20* (2023.01); *B64U 2101/30*
(2023.01); *B64U 2201/20* (2023.01)

(56) References Cited

U.S. PATENT DOCUMENTS

| | | | |
|---|---|---|---|
| 2014/0207282 A1 | 7/2014 | Angle et al. | |
| 2017/0054725 A1* | 2/2017 | Manley | H04L 63/10 |
| 2017/0227965 A1* | 8/2017 | Decenzo | G05D 1/0206 |
| 2018/0158259 A1 | 6/2018 | Shi et al. | |
| 2018/0329413 A1 | 11/2018 | Charalambides et al. | |
| 2019/0077509 A1 | 3/2019 | Hsu et al. | |
| 2019/0215214 A1 | 7/2019 | Kim et al. | |
| 2019/0265694 A1 | 8/2019 | Chen et al. | |
| 2021/0194578 A1* | 6/2021 | Tonkin | G06T 7/20 |

OTHER PUBLICATIONS

Extended European Search Report from EP App. No. 21800925.6
(filed Nov. 24, 2022), mailed Apr. 23, 2024.

* cited by examiner

LONG DISTANCE TRANS-CONTINENTAL REMOTE DRONE PILOTING SYSTEM

CROSS-REFERENCE TO RELATED APPLICATIONS

This application claims priority to U.S. Provisional Patent Application No. 63/020,546 filed May 6, 2020, the entirety of which is hereby incorporated by reference.

BACKGROUND

The present application generally pertains to controlling drones and more piloting drones from remote locations.

Controlling drones through various means is generally known. However, remote piloting of drones can suffer from connection latency which impedes successful control from physical locations different from the drone. This leads to the expenditure of additional resources at any number of locations where the drones may be deployed and operating.

SUMMARY

In some examples, a remote drone pilot system includes a pilot endpoint system including a pilot endpoint and a controller connected to the pilot endpoint. A control endpoint system includes a control endpoint, a signal adaptor connected to the control endpoint, and a transmitter connected to the signal adaptor. A drone is arranged to communicate with the transmitter to receive and send drone operating data to the control endpoint system. The drone is also arranged to communicate drone video data to the control endpoint system. A remote bridge, including a server, is arranged to connect the pilot endpoint and the control endpoint using an internet protocol when the pilot endpoint and the control endpoint are located at different geographic locations such that the drone operating data and the drone video data are communicated amongst the pilot endpoint, control endpoint, and drone in real-time.

In some examples of the remote drone pilot system, the remote bridge includes a broker module arranged to authenticate a connection between remote bridge and each of the control endpoint and the remote endpoint.

In some examples of the remote drone pilot system, the remote bridge further includes an artificial intelligence system engine that is arranged to conduct real-time analysis on the drone video data and drone operating data.

In some examples of the remote drone pilot system, the controller includes a joystick, wherein each of the pilot endpoint and control endpoint comprise a graphical user interface configured to display the drone video data and at least some of the drone operating data.

In some examples of the remote drone pilot system, the drone includes a camera, and the drone video data from the drone is arranged to be communicated to a video device on the signal adaptor.

In some examples of the remote drone pilot system, the pilot endpoint system further includes an audio device. The audio device is connected to the pilot endpoint such that commands can be input into the pilot endpoint verbally via the audio device.

In some examples of the remote drone pilot system, the pilot endpoint comprises a plurality of pilot endpoints. A first of the plurality of pilot endpoints is arranged to provide commands to control the drone and a second of the plurality of pilot endpoints is configured to only view the drone video data and the drone operating data. The drone video data and the drone operating data is displayed identically on a graphical user interface display on each of the first and second of the plurality of pilot endpoints.

In some examples of the remote drone pilot system, the signal adaptor is connected to the control endpoint by a first USB connection and the controller is connected to the pilot endpoint by a second USB connection.

In some examples of the remote drone pilot system, the drone, remote bridge, control endpoint system, and pilot endpoint system are arranged to operate with a connection latency of about or less than 150 milliseconds (ms).

In some examples of the remote drone pilot system, the drone, remote bridge, control endpoint system, and pilot endpoint system are arranged to operate with a connection latency of between about 100 ms and about 150 ms.

In some examples, a method of piloting a drone remotely includes connecting a pilot endpoint located in first geographic area to a control endpoint located in a second geographic area through a remote bridge. The pilot endpoint, control endpoint, and remote bridge connect using an internet protocol. A command is communicated from the pilot endpoint to the control endpoint through the remote bridge. The command is communicated from the control endpoint through a signal adaptor to a transmitter. The command is communicated from transmitter to a drone such that the drone is operated based on the command. Drone operating data is communicated from the drone to signal adaptor through the transmitter. The drone operating data is converted into a form readable by the control endpoint. Drone video data is communicated from the drone to the signal adaptor. The converted drone operating data and the drone video data are communicated to the control endpoint, and then to the pilot endpoint through the remote bridge. The drone video data and the converted drone operating data are displayed on the pilot endpoint, wherein steps (b)-(i) occur with a connection latency of about or less than 150 ms.

In some examples of the method of piloting a drone remotely, the step of connecting the pilot endpoint to the control endpoint through a remote bridge includes authenticating the pilot endpoint and the control endpoint using a broker module of a server of the remote bridge.

In some examples of the method of piloting a drone remotely the remote bridge is a first remote bridge including a server with a search module, and the method includes the steps of determining using the search module a desirable second remote bridge from a plurality of second remote bridges. The control endpoint and the pilot endpoint are transferred to be connected through the desirable second remote bridge.

In some examples of the method of piloting a drone remotely, the search module determines the desirable second remote bridge based on one or more of shortest latency between the control endpoint and the pilot endpoint, shortest physical distance between the control endpoint and the pilot endpoint, and geographical proximity to the control endpoint or the pilot endpoint.

In some examples of the method of piloting a drone remotely, the method includes the step of providing drone video data to an artificial intelligence system AI engine of a server of the remote bridge. A real-time analysis is conducted on drone video data to identify at least one of a number of objects viewed, a frequency of objects viewed, or a particular targeted object. The drone, the remote bridge, the control endpoint system, and the pilot endpoint system are connected with a latency of about or less than 150 ms. The real-time analysis is communicated to at least one of the pilot endpoint and the control endpoint.

In some examples of the method of piloting a drone remotely, the step of conducting real-time analysis further includes classifying the at least one of the number of objects viewed, the frequency of objects viewed, or the particular targeted object to detect a component, sub-assembly, or system on the drone video data and create a report of a classification.

In some examples of the method of piloting a drone remotely, the method includes the step of transmitting the command verbally to the pilot endpoint using an audio device including a microphone.

In some examples of the method of piloting a drone remotely, the method includes the steps of connecting a second pilot endpoint to the control endpoint. The first pilot endpoint communicates commands to pilot the drone and the second pilot endpoint communicates commands to control the operation of a camera on the drone providing the drone video data.

In some examples of the method of piloting a drone remotely, the method includes the step of multiplexing the drone video data communicated from the control endpoint using the remote bridge. The multiplexed drone video data is displayed on a graphical user interface of each of a plurality of additional pilot endpoints.

BRIEF DESCRIPTION OF DRAWINGS

The various features and advantages of the disclosed examples will become apparent to those skilled in the art from the following detailed description.

DETAILED DESCRIPTION

Figure 1:
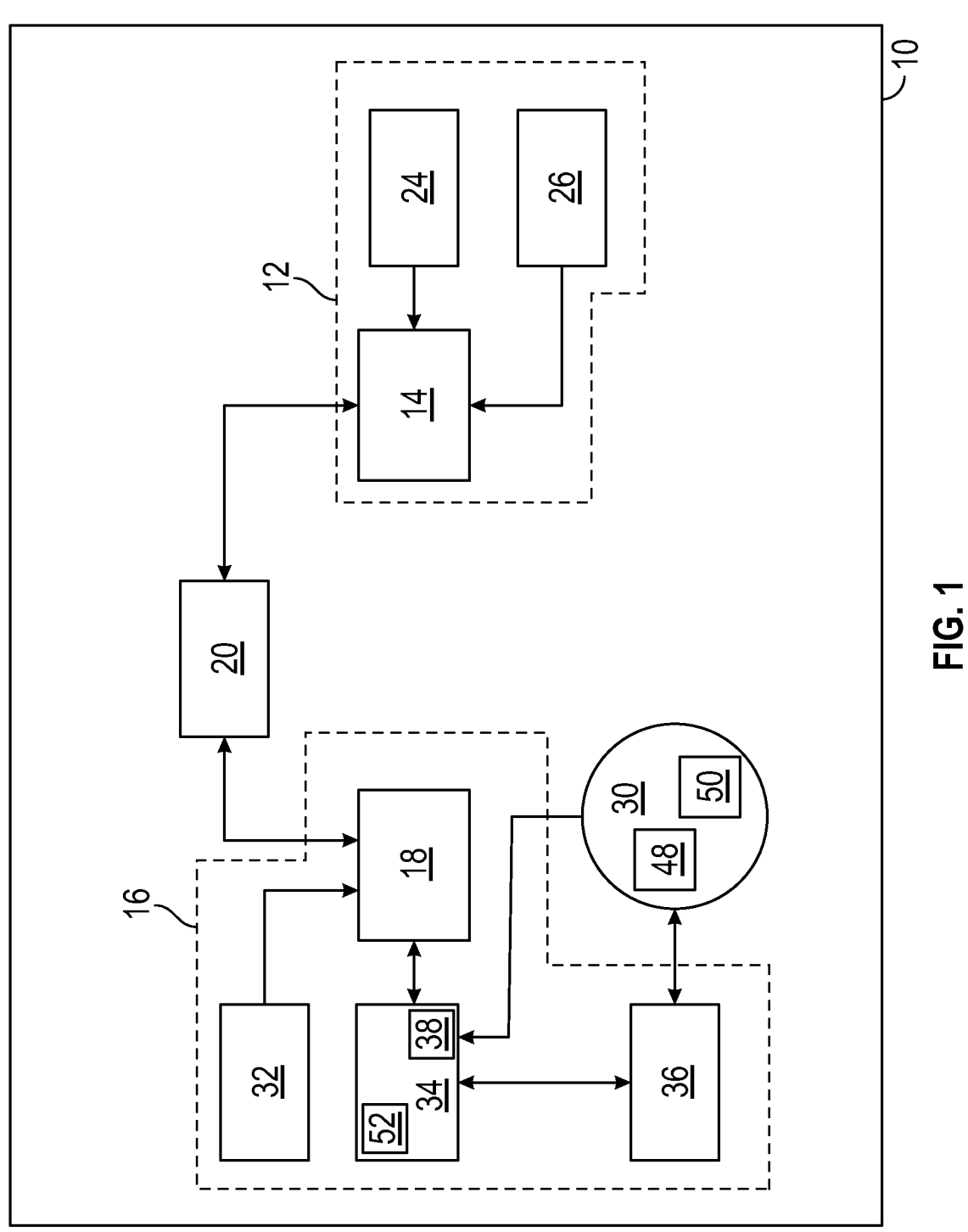
FIG. 1 is a schematic view of an example remote drone piloting system.
Figure 2:
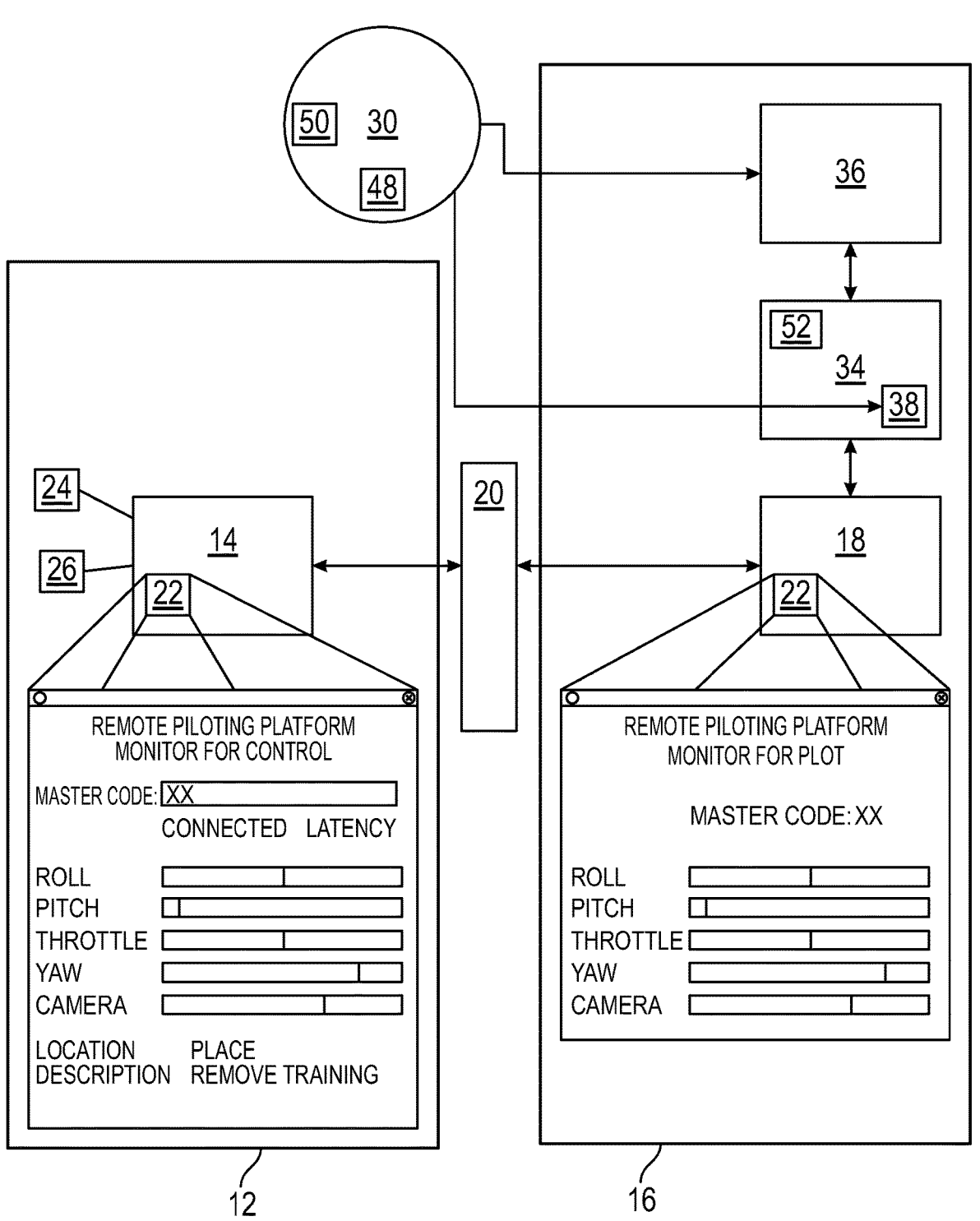
FIG. 2 is another schematic view of the example remote drone piloting system of FIG. 1 with an example GUI shown.
Figure 3:
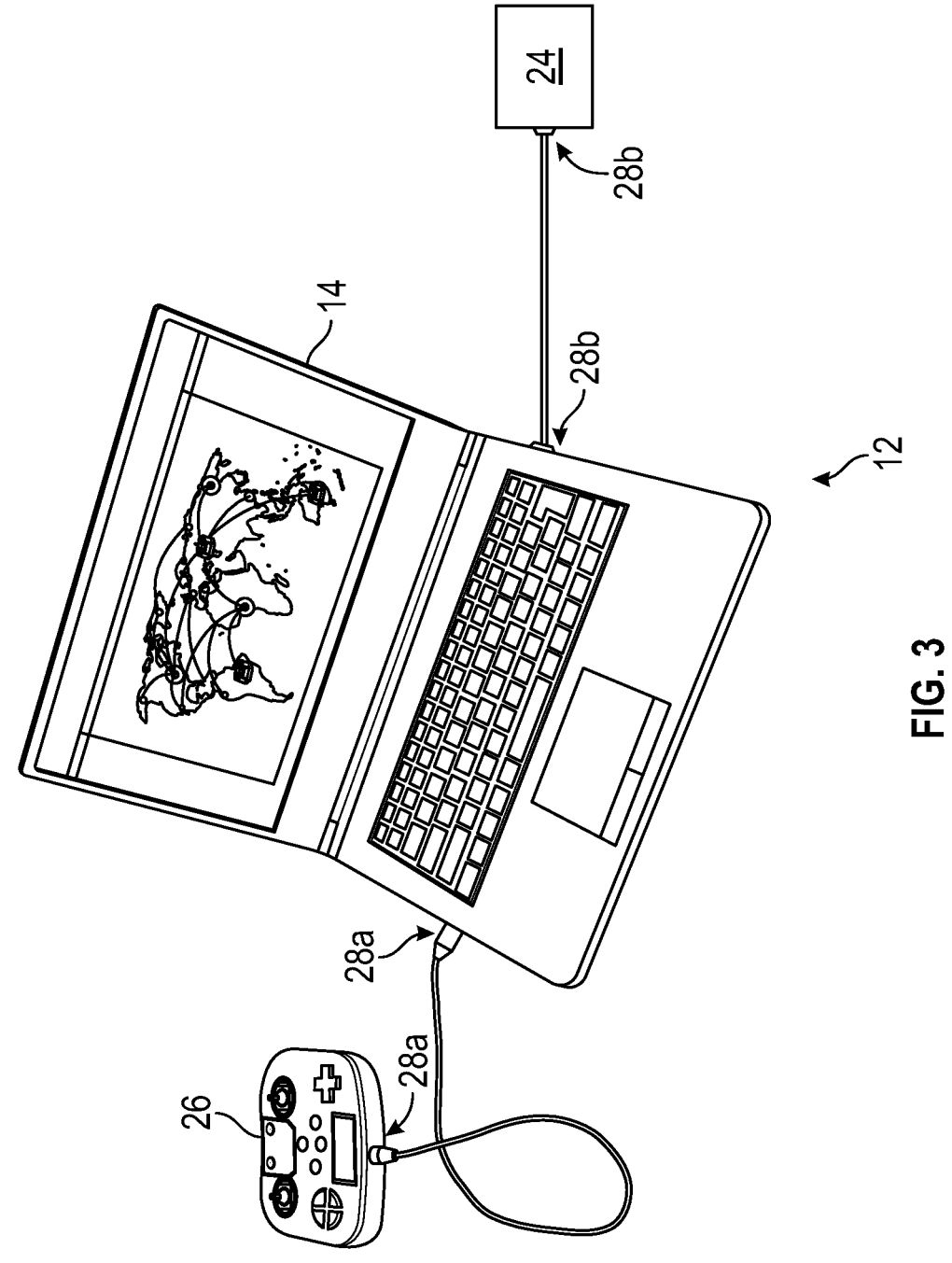
FIG. 3 is a perspective view of an example pilot endpoint system.
Figure 4:
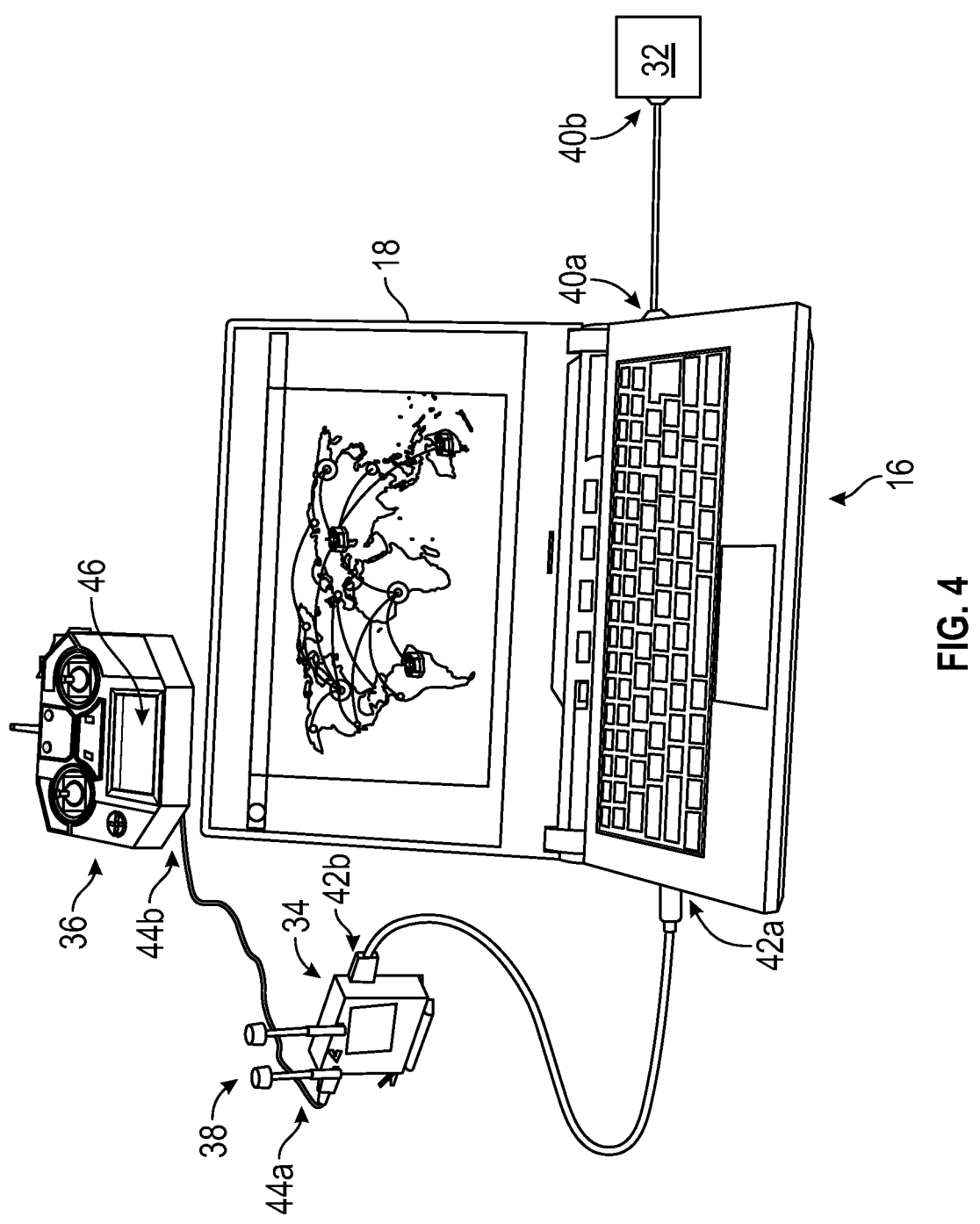
FIG. 4 is a perspective view of an example control endpoint system.

Referring to FIGS. 1-4, an example drone remote pilot system 10 includes pilot (or slave) endpoint system 12 including a pilot (or slave) endpoint 14, a control (or master) endpoint system 16 including a control (or master) endpoint 18, a remote bridge 20, and a drone 30. Each of the pilot endpoint 14 and control endpoint 18 are in communication with the remote bridge 20 to transmit data to the remote bridge 20 and receive data from the remote bridge 20. The pilot endpoint system 12 and control endpoint system 16 may be geographically located in different physical locations in relation to one another. The pilot endpoint 14 and control endpoint 18 are connected to one another through the remote bridge 20. In some examples, the connection via the remote bridge 20 emulates a peer-to-peer connection between the pilot endpoint 14 and control endpoint 18. Each of the pilot endpoint 14 and control endpoint 18 is a computing system includes at least one processor and at least one non-transitory computer-readable media storing instructions that, when executed by the at least one processor, cause the computer system to perform the operations disclosed herein.

Each of the pilot endpoint 12 and the control endpoint 18 include a graphical user interface (GUI) 22. The GUI 22 display information based on software formulated for remote piloting of the drone 30. In some examples, the GUI 22 may display drone 30 operating data such as controls, commands, information about the drone 30, data from the drone 30 such as roll, pitch, throttle, yaw, location, speed, altitude, power levels, depth, telemetry, latency time, and/or data from the remote bridge 20. The GUI 22 may also display other information related to the operation of the drone 30 such as weather conditions and other moving objects nearby. The GUI 22 may also display a video feed provided from the drone 30, or alternatively, of the pilot or other user. In some examples, the display of the GUI 22 of the control endpoint 18 is mirrored and viewable by the pilot on the GUI of the pilot endpoint 12.

In some examples, the GUI 22 of the pilot endpoint 14 and/or control endpoint 18 displays a dashboard that shows the status of overall connections within the drone remote pilot system 10 or the status of a specific connection between pilot endpoint and control endpoint 18 through remote bridge 20.

In some examples, the pilot endpoint system 12 includes an audio device 24 and a pilot controller 26 that are connected to the pilot endpoint 14. In some examples, the pilot controller 26 is a handheld controller that includes controls for piloting the drone 30. Such controls may include one or more joysticks. In this example, the pilot controller 26 is connected to the pilot endpoint 14 through a wired Universal Serial Bus (USB) connection 28a. Alternatively, pilot controller 26 is connected to the pilot endpoint 14 through a wireless system, such as a WiFi network, a LAN, a WAN, a WPAN, Bluetooth, or other wireless communication system, or through another wired connection data transmitting cable. In operation, the pilot controller 26 allows the remote pilot utilizing the pilot system 12 to execute control of the drone 30 in real-time by providing commands through the connection to the control endpoint system 16, as will be discussed in further detail herein. Such commands operate to allow control of the flight of the drone 30, use of the camera 50 on the drone 30, and use of any other onboard drone 30 systems or functionalities.

In some examples, audio device 24 is connected to the pilot endpoint 14 through a wired USB connection 28a, 28b. Alternatively, audio device 24 is connected to the pilot endpoint 14 through a wireless system, such as a WiFi network, a LAN, a WAN, a WPAN, Bluetooth, or other wireless communication system, or through another wired connection data transmitting cable. In some examples, the audio device 24 is a speaker or microphone; however, other audio devices are within the contemplation of this disclosure. In some examples, the audio device 24 allows for the pilot to provide voice commands to control and operate the drone 30. In this manner, the drone 30 can be operated similarly to how it would be operated with pilot controller 26 and in real-time from a remote location.

In some examples, the control endpoint system 16 includes an audio device 32, a signal adaptor 34, a transmitter/controller 36, and a video device 38. Audio device 32 is connected to the control endpoint 18 through a wired USB connection 40a, 40b. Alternatively, audio device 24 is connected to the pilot endpoint 14 through a wireless system, such as a WiFi network, a LAN, a WAN, a WPAN, Bluetooth, or other wireless communication system, or through another wired connection data transmitting cable. In some examples, the audio device 32 is a speaker or microphone; however, other audio devices are within the contemplation of this disclosure. In some examples, the audio device 32 transmits audio input, such as voice commands, recordings, instructions, or other audio messages to the control endpoint 18.

Figure 5:
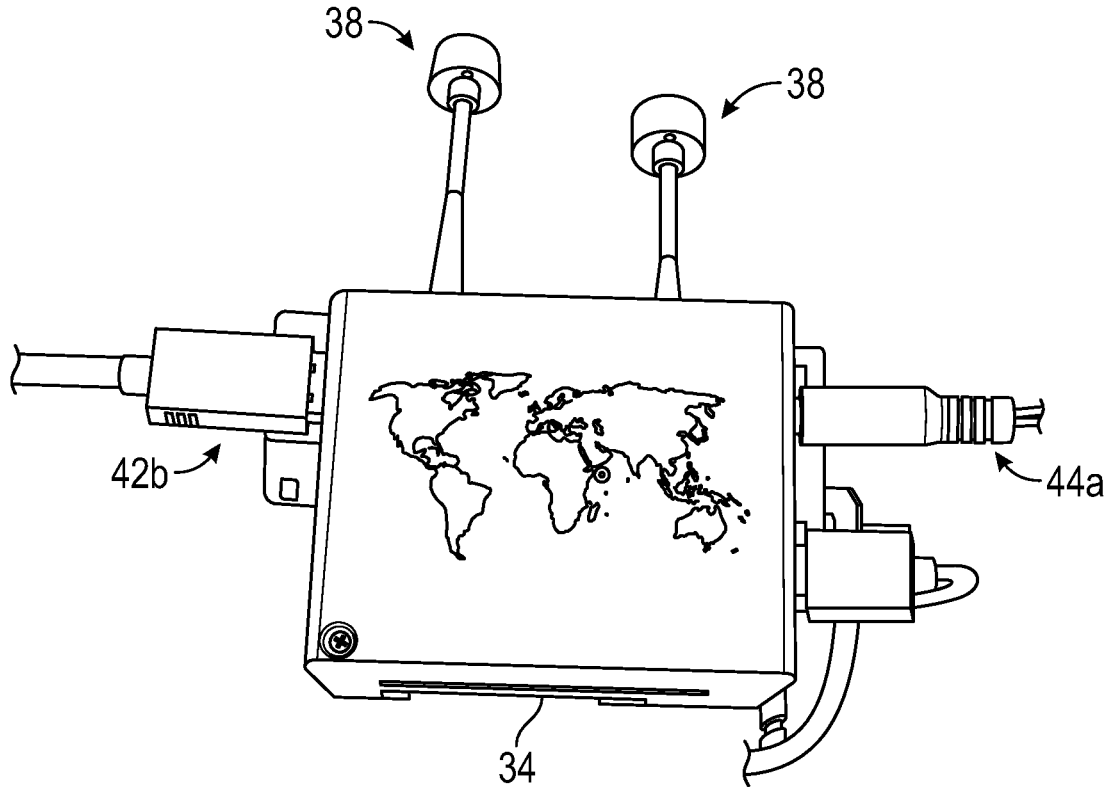
FIG. 5 is a perspective view of an example signal adaptor.

Referring to FIG. 5, with continued reference to FIGS. 1-4, in some examples, the signal adaptor 34 is connected to the control endpoint 18 and the transmitter/controller 36. The signal adaptor 34 connects to the control endpoint 18 through a wired USB connection 42a, 42b. Alternatively, signal adaptor 34 is connected to the control endpoint 18 through a wireless system, such as a WiFi network, a LAN, a WAN, a WPAN, Bluetooth, or other wireless communication system or through another wired connection data transmitting cable. The signal adaptor 34 connects to the transmitter/controller 36 through a direct cable connection 44a, 44b. Alternatively, signal adaptor 34 connects to the transmitter/controller 36 through a wireless system, such as a WiFi network, a LAN, a WAN, a WPAN, Bluetooth, or other wireless communication system.

In some examples, the transmitter/controller 36 communicates with the drone 30. In this example, the transmitter/controller 36 is a radio controller transmitting signals to the drone 30 and receiving radio signals from the drone 30. However, other types of transmitter/controllers 36 are contemplated. In some examples, transmitter/controller 36 also includes a screen 46 that displays information that may include drone 30 operating data pertaining to the drone 30 flight and controls (as described herein) as well as radio frequency, or other information pertaining to the connection of the transmitter/controller 36 and the drone 30. In some examples, the transmitter/controller 36 communicates with the drone 30 at a frequency of 2.4 GHz or 5.8 GHz. In some examples, transmitter/controller 36 communicates with the drone 30 at a frequency between 2.4 GHz and 5.8 GHz. In some examples, the transmitter/controller 36 communicates with the drone 30 via ultrawide band (UWB) at a frequency between 6 GHz and 9 GHz.

In some examples, after receiving a command for the drone 30 from the pilot endpoint, the control endpoint 18 sends the command to the signal adaptor 34, which transmits the command to the transmitter/controller 36 to then send to the drone 30. Likewise, the drone 30 transmits drone 30 operating data back to the transmitter/controller 36 through a drone transmitter 48. The transmitter/controller 36 sends the data to the signal adaptor 34, which converts the data received from the drone 30 to a standard signal to transmit the data through the USB connection to the control endpoint 18. The signal adaptor 34 includes microcontroller 52 that converts and standardizes all protocols, data, signals, and video provided by the drone 30 so as to be readable by the control endpoint 18. The data is then readable, viewable, and usable on the control endpoint 18. In this manner, the signal adaptor 34 and microcontroller 52 compress and condense data in multiple channels of a pulse width modulation (PWM) protocol from the drone 30 into a single channel pulse position modulation (PPM) protocol. The data can then be further converted into serial data for further transmission and use. The drone 30 operating data transmitted in this manner includes, but is not limited to, information and data pertaining to drone 30 controls, telemetry, altitude, speed, roll, pitch, auxiliaries, throttle, yaw, bank, location and/or other similar drone 30 operating data used for remote operation of the drone 30. The data transmitted may also be tailored to the type of drone 30 being used and the specific operation or task the drone 30 is undertaking.

In some examples, the signal adaptor 34 also includes the video device 38 in communication with the drone 30 via the drone transmitter 48. In some examples, the video device 38 is one or more antenna to receive video data from the drone 30. In some examples, the video device 38 includes four antennas, two of which are directional antennas and two of which are omni antennas. However, other video devices 38 are contemplated.

Drone 30 includes a camera 50 which can provide a real-time video feed of the environment surrounding the drone 30. Camera 50 may also record the video stream, as well as to capture still images, while still maintaining the real-time video feed. The video feed from camera 50 is transmitted by drone transmitter 48 to the video device 38 of the signal adaptor 34. The microcontroller 52 of the signal adaptor 34 converts the video feed transmitted by the drone 30 to a standard signal and the signal adaptor 34 transmits the video feed to the control endpoint 18 for viewing and further use.

In some embodiments, control endpoint 18 is connected to signal adaptor 34 through multiple USB connections 42a, 42b, or other disclosed connections. In this manner, non-video data can be transmitted to or from the drone 30 separately from video data from the drone 30.

In some examples, the pilot endpoint 14 and/or the control endpoint 18 is a desktop computer, laptop computer, tablet, or other electronic device having similar hardware and software capability. Each of the pilot endpoint 14 and the control endpoint 18 may connect to additional devices by one or more of physical connections or wireless connections as described in further detail below. Each of the pilot endpoint 14 and control endpoint 18 are connected to the internet to receive and transmit data, and to communicate with the remote bridge 20. Likewise, the remote bridge 20 is connected to the internet to receive and transmit data, and to communicate with the control endpoint 18 and pilot endpoint 14. In some examples, the pilot endpoint 14, control endpoint 18, and remote bridge 20 communicate using a user datagram protocol (UDP) or a transmission control protocol (TCP/TCP-IP).

In another example, the pilot endpoint 14, control endpoint 18, and remote bridge 20 communicate using a satellite server or mobile server. However, other communication systems are contemplated by this disclosure for communications between the pilot endpoint 14, control endpoint 18, and remote bridge 20.

In some examples, the control endpoint 18 operates to execute a command ending the acceptance of commands from pilot endpoint 14 in order to take control of the drone 30. In some examples, control endpoint 18 can take control for purposes of allowing a different pilot endpoint 14 to control, or alternatively to end remote control and allow for an operator at the control endpoint 18 to directly control the drone 30.

With continued reference to FIGS. 1-5, and all of the features and disclosure herein, in some examples the system 10 includes multiple control endpoints 18 and multiple pilot endpoints 14 all connected and communicating through the remote bridge. In these examples, the remote bridge 20 multiplexes the transmission from one or both of the control endpoints 18 and pilot endpoints 14 to provide the same transmission of data to multiple pilot endpoints 14 or control endpoints 18. In some examples, a first pilot endpoint 14 may be used by a pilot operating the drone 30 and additional pilot endpoints 14 are used by non-pilot viewers watching the real-time video feed and/or receive drone 30 data. In another example, multiple control endpoints 18 may also be used as part of the same system 10, with each connected to and communicating with at least one pilot endpoint 14. In this manner, additional pilot endpoints can allow non-pilot viewers to watch and monitor real-time video feeds and drone 30 data from multiple control endpoints 18 and drones 30 simultaneously. In some examples, more than one pilot endpoint 14 can control a single drone 30 through a single control endpoint 18. In this example, one pilot can control the flight of the drone 30 and another can control the video feed or other features present on the drone 30. The multiple control endpoints 18 can also all be connected and communicating with a single pilot endpoint 14, which can serve to pilot them as necessary, or pilot one while viewing others. In some examples, a single pilot operating a single pilot endpoint 14 can have an override command to take control of any drone 30 controlled through control endpoints 18.

In some examples, the multiple pilot endpoints 14 and multiple control endpoints 18 communicate verbal discussions, commands, or observations in real-time, using audio devices 24, 32, such that observers at any of pilot endpoints 14 and control endpoints 18 can share instructions, make suggestions, assist the pilot operating the drone 30, or similar collaborations.

Drone 30 may comprise an unmanned aerial vehicle (UAV), land based/terrain based vehicle, submersible or water based vehicle, such as a boat, submarine, or any other vehicle that moves under power.

In some examples, there may be an operator in the same physical location as the control endpoint 18 to enable further verbal communication with a pilot at the pilot endpoint 14. The audio devices 24, 32 allow for continued audio communication, recording, and transmission between the control endpoint system 16 and the pilot endpoint system 12. In some examples, transmission of audio signals may occur using network channels or sensors external to the system 10 that determine whether the audio devices 24, 32 are with the user at a particular location.

Figure 6:
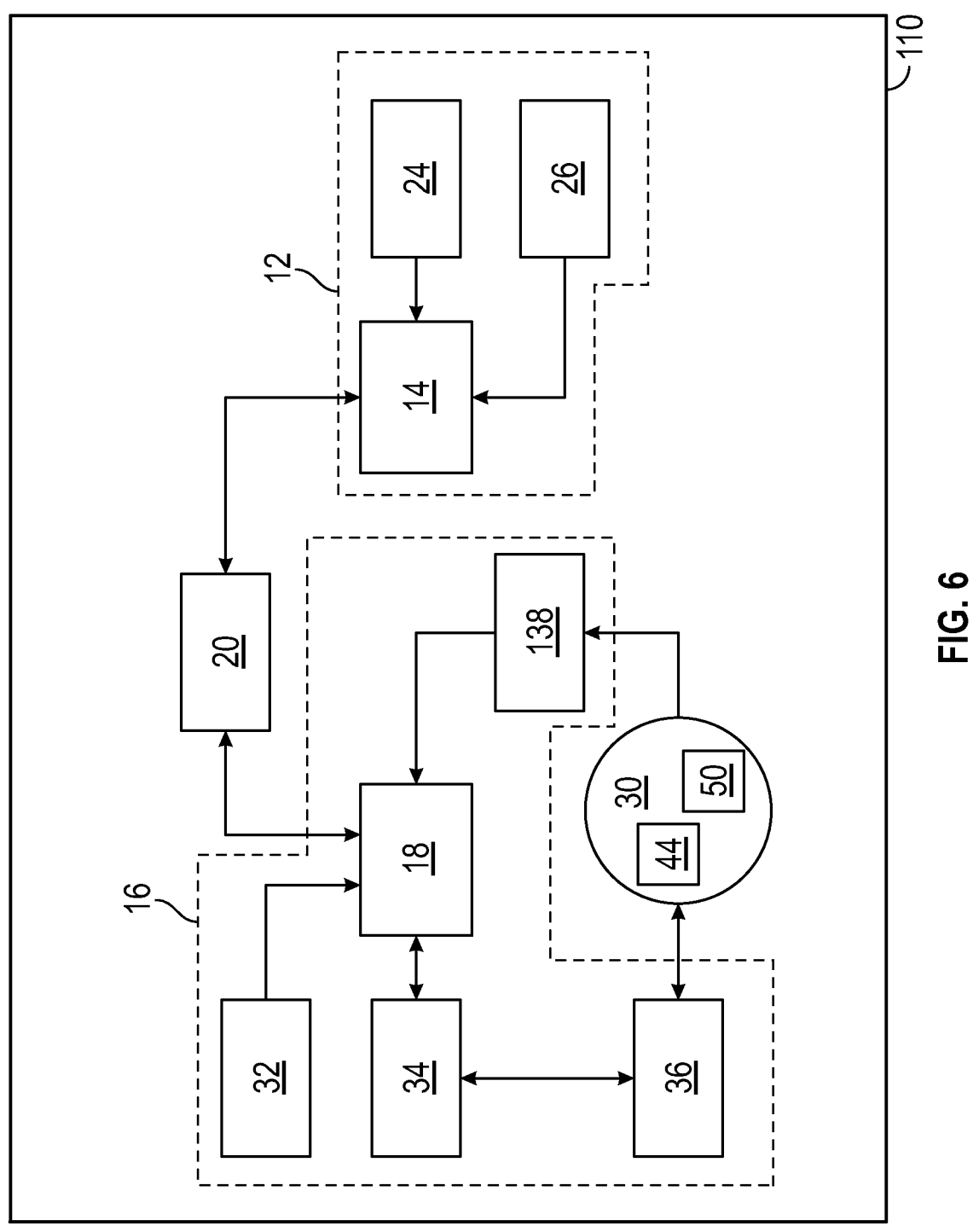
FIG. 6 is a schematic view of another example remote drone piloting system.

Referring to FIG. 6, with continued reference to FIGS. 1-5, another example drone remote pilot system 110 is shown. Unless otherwise specified, all features of drone remote pilot system 110 are the same as drone remote pilot system 10. The control endpoint system 16 of drone remote pilot system 110 includes a video device 138 separate from signal adapter 34. Video device 138 has the same structure and features of video device 38 as described herein, but communicates directly with control endpoint 18 to provide real-time video feed data from the drone 30 to the control endpoint 18.

In another example (not shown), control endpoint 18 includes and integrates signal adaptor 34, transmitter/controller 36, and video device 38 such that the control endpoint 18 and drone 30 are in direct communication. In this example, additional signal adaptors and transmitter/controllers 36 may be included on the drone 30.

Figure 7A:
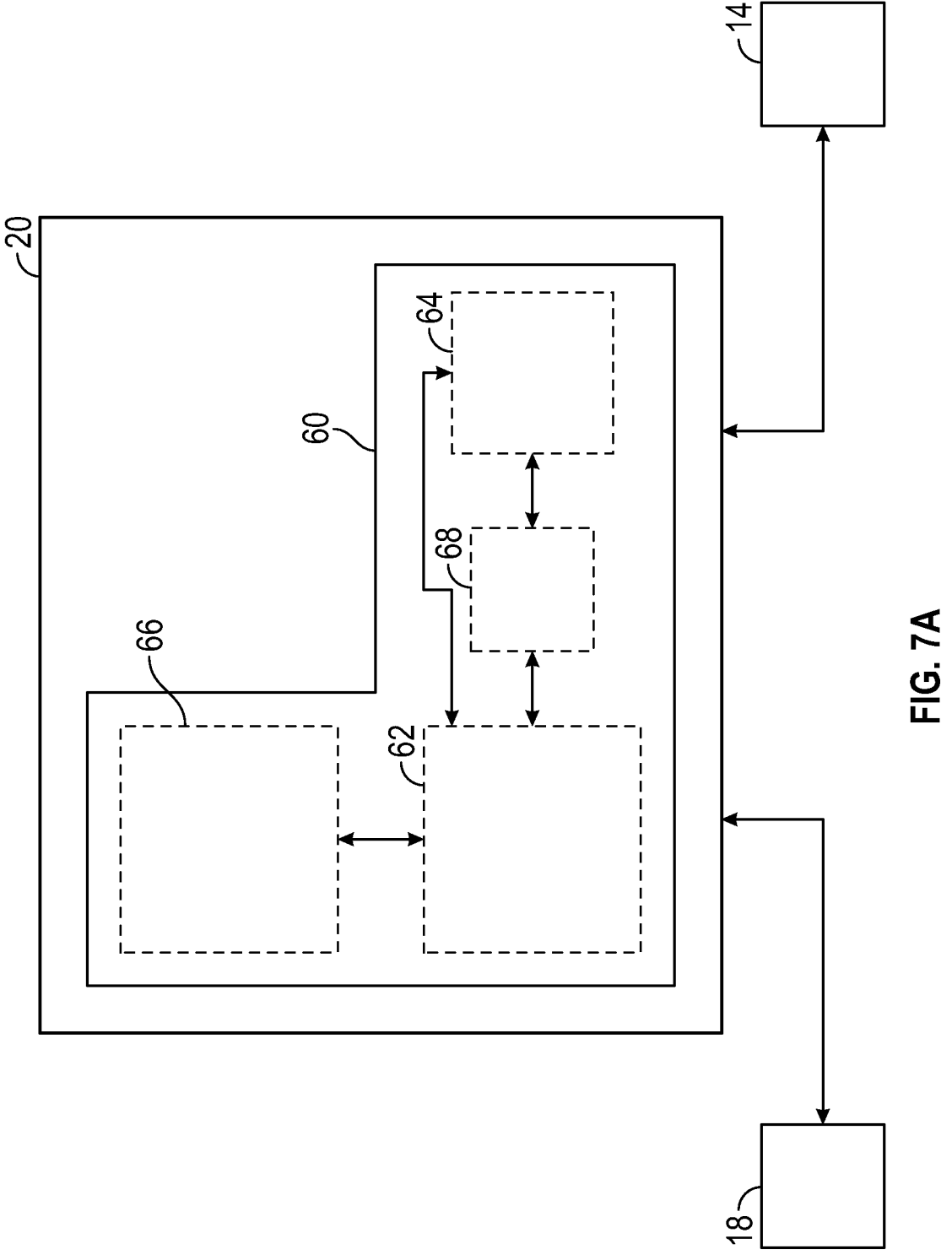
FIG. 7A is a schematic view of an example remote bridge, control endpoint, and pilot endpoint.

Referring to FIG. 7A, with continued reference to FIGS. 1-6, remote bridge 20 simulates a peer to peer communication between the control endpoint 18 and the pilot endpoint 14 using internet protocols (UDP/TCP/TCP-IP). Control endpoint 18 and pilot endpoint 14 communicate through the remote bridge 20 and, therefore, receive data from the remote bridge 20 and transmit data to the remote bridge 20. The remote bridge 20 includes a server 60.

The server 60 is a computing system includes at least one processor and at least one non-transitory computer-readable media storing instructions that, when executed by the at least one processor, cause the computer system to perform the following operations and the operations disclosed herein.

Server 60 includes a broker module 62, a bridge module 64, and a cloud storage system 66.

Broker module 62 operates to authenticate the control endpoint 18 connection and the pilot endpoint 14 connection to the remote bridge 20 and to each other. The broker module 62 certifies authorization for any such control endpoint 18 or pilot endpoint 14 to connect to the remote bridge 20. By denying or allowing connections to the remote bridge 20, broker module 62 controls the number, frequency, and speed of transmissions and communications through the remote bridge 20.

Broker module 62 also operates to control what control endpoints 18 are connected to particular pilot endpoints 14 by authenticating or declining to authenticate the connection.

In some examples, broker module 62 operates to provide additional modeling based on the real-time video data from the drone 30 provided by a control endpoint 18. In this example, when the broker module 62 receives the video data that has to go to the pilot endpoint 14 for use by the pilot, the broker module 62 may determine additional computational modeling should be included. The broker module 62 prepares the video data for additional analysis or modeling before sending it to the pilot endpoint 14. In some examples, the broker module 62 determines whether drone 30 video data should go to the pilot endpoint 14 or be sent for additional analysis in real-time.

In some examples, the analysis is completed by an artificial intelligence software (AIS) engine 68. In some examples, the analysis includes object recognition and classification. For example, the AIS engine 68 analyzes the real-time video data and identifies various objects during an inspection of a facility by a drone 30. The AIS engine 68 can classify different types of objects, and provide a report on the number, frequency, or other similar parameters to the pilot or other users using pilot endpoints 14 in real-time. The AIS engine 68 can also analyze these objects to provide a component, sub-assembly, or system level analysis based on what is being viewed in the drone video data. The analysis can also be provided to the control endpoint 18 if necessary, or if a pilot is controlling or assisting controlling the drone 30 from the physical location of the control endpoint 18.

In another example, the analysis includes navigation recognition such as identifying landmarks, land masses, bodies of water, or other similar, recognizable navigational markers. A report from the AIS engine 68 is provided to the pilot or viewer at the pilot endpoint 14.

In some examples, the AIS engine 68 may include a neuron network able to interpret video in real-time to recognize or identify problems that need the attention of the pilot or viewers. By way of example, the AIS engine 68 neuron network may be used to inspect a facility and determine how many bolts are being used in a particular area for construction. In this example, if the number of bolts does not equate to the number that should be present, the AIS engine recognizes that problem and identifies it for the pilot or viewer. This analysis is done in real-time based on the real-time video. Other applications of similar analysis to identify a problem for the pilot or other viewers at the pilot endpoint 14 or control endpoint 18 are within the contemplation of this disclosure. In some examples, the AIS engine 68 can serve as the pilot and control the drone 30 through the control endpoint 18 while displaying real-time video and drone 30 operating data to viewers via the pilot endpoint 14.

Due to the low latency in the communications of the remote drone remote pilot system 10 as discussed herein, the remote bridge 20 provides analysis in real-time along with real-time video feeds, commands, communications, and other transmissions allowing for remote control of the drone 30 by the pilot endpoint 14.

In some examples, broker module 62 also authenticates the connections between pilot endpoints 14 and control endpoints 18. In some examples, authentication includes a code sent to the control endpoint 18 that is confirmed by an operator at the control endpoint 18, or through an alternative means such as email, text message, or similar authentication. In some examples, all communications and communication channels are encrypted and access is granted only after confirmation of a valid code or credentials confirmed by the broker module 62. In some examples, broker module 62 also encrypts, or handles already encrypted, drone 30 video data. In some examples, the drone 30 video data is encrypted using an improved Advanced Encryption Standard (AES256) with a 256-bit key length. In addition to securing the video data being communicated through the remote bridge 20, the broker module 62 is able to reduce latency via this encryption due to further compression of the data which makes it smaller for transmission purposes.

In operation if the broker module 62 authenticates the pilot endpoint 14 and the control endpoint 18 connection to both the remote bridge 20 and each other, the bridge module 64 can accept and transmit the corresponding data. Once authenticated and connected, the bridge will transmit the video or control data. At the same time, the broker module 62 will also determine whether additional, real-time analysis should be completed by AIS engine 68. If so, a report of that analysis, along with the video or control data, is transmitted by the bridge module 64 to the receiving endpoint 14, 18.

The bridge module 64 of the remote bridge 20 operates to control transmission of drone 30 video data and drone 30 operating data and drone 30 commands to and from the control endpoint 18 and pilot endpoint 14. In some examples, the bridge module 64 also operates to code the video data to reduce latency by way of compressing video data or files.

The bridge module 64 further operates to connect each pilot endpoint 14 to the corresponding correct control endpoint 18 and vice versa. Bridge module 64 handles multiple connections between multiple pilot endpoints 14 and control endpoints 18 simultaneously.

Figure 7B:
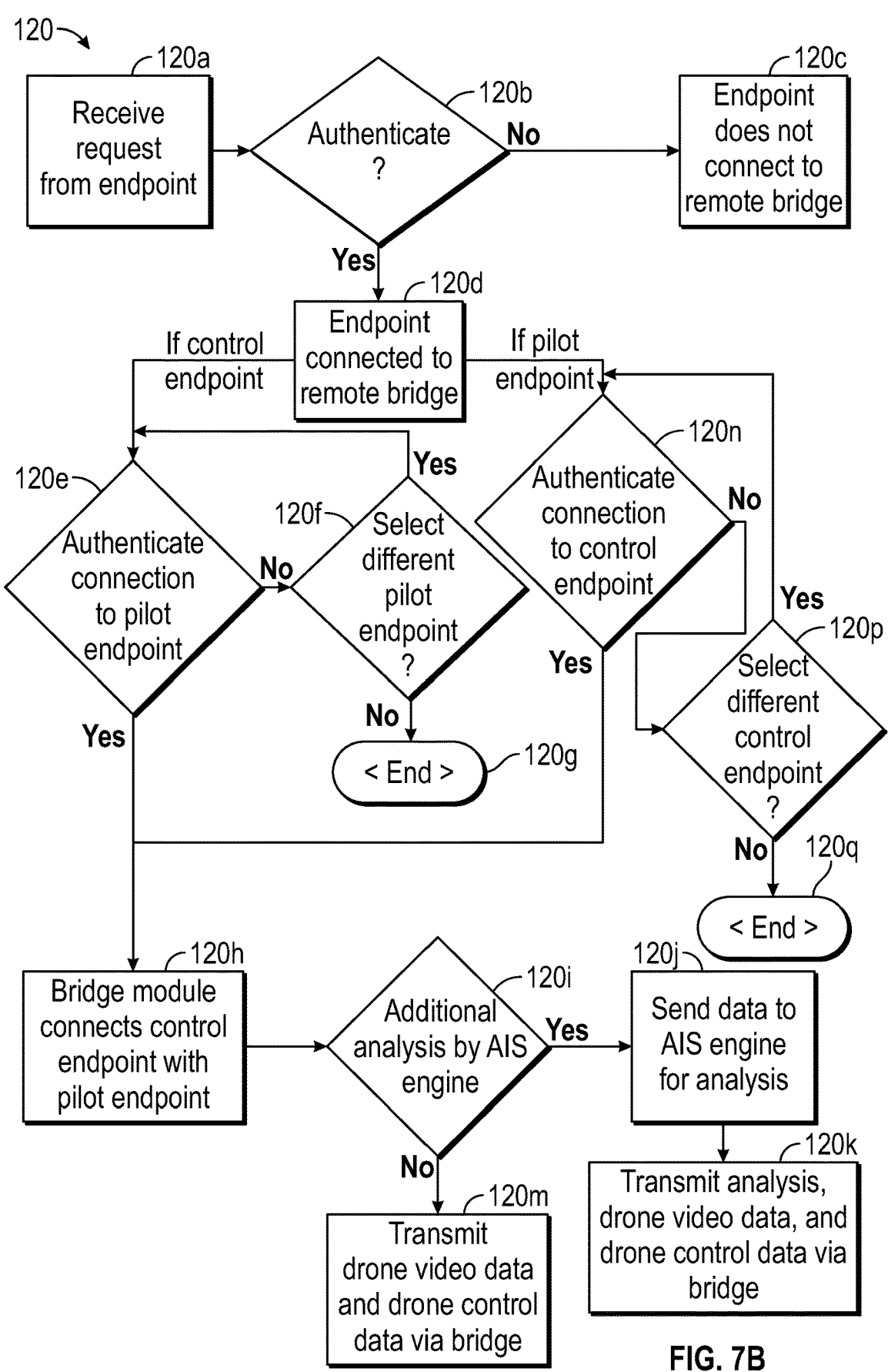
FIG. 7B is an example process for operation of the bridge module and broker module.

With continued reference to FIG. 7A, FIG. 7B illustrates an example flow chart 120 showing exemplary operation of the broker module 62 and the bridge module 64 per the above herein described features and operations. The process can be utilized with any of the broker modules 62 on the servers 60 described herein and executed on the server 60 of each remote bridge 20. The server 60 is programmed with logic or otherwise configured to execute the process 120. The broker module 62 of the server 60 receives a request from a pilot endpoint 14 or control endpoint 18 to connect to the remote bridge 20 and a corresponding control endpoint 18 or pilot endpoint 14 (Step 120a). The broker module 62 determines whether to authenticate the request (Step 120b). If the broker module 62 does not authenticate the request, the requesting endpoint 14, 18 is not connected to the remote bridge 20 and the process is ended (Step 120c). If the broker module 62 authenticates the request, the requesting endpoint 14, 18 is connected to the remote bridge 20 by the bridge module 64 (Step 120d).

If the requesting endpoint is a control endpoint 18, the broker module 62 authenticates the connection of the control endpoint 18 to the requested pilot endpoint 14 (Step 120e). If the broker module 62 does not authenticate the request, the control endpoint 18 can resubmit the request or request connection to a different pilot endpoint 14 (step 120f). If such a request is made, authentication is attempted again at Step 120e. If such a request is not made, the process ends and the control endpoint 18 is not connected to a pilot endpoint 14 (Step 120g). At Step 120e, if the broker module 62 does authenticate the request, the bridge module 64 connects the control endpoint 18 with the corresponding pilot endpoint 14 (Step 120h). The broker module then determines whether additional analysis by the AIS engine is requested or necessary (Step 120i). If so, the broker module 62 sends the data to the AIS engine 68 for analysis (Step 120j). After analysis, the analysis is provided to the bridge module 64 and the bridge module 64 transmits the analysis, drone 30 video data, and drone 30 control data to the pilot endpoint 14 (step 120k). At step 120i, if additional analysis by the AIS engine 68 is not requested or necessary, the bridge module 64 transmits the drone 30 video data and drone 30 control data to the pilot endpoint 14 (step 120m).

At Step 120d, if the requesting endpoint is a pilot endpoint 14, the broker module 62 authenticates the connection of the pilot endpoint 14 to the requested control endpoint 18 (Step 120m). If the broker module 62 does not authenticate the request, the pilot endpoint 14 can resubmit the request or request connection to a different control endpoint 18 (step 120p). If such a request is made, authentication is attempted again at Step 120e. If such a request is not made, the process ends and the pilot endpoint 14 is not connected to a control endpoint 18 (Step 120q). At Step 120e, if the broker module 62 does authenticate the request, the bridge module 64 connects the pilot endpoint 14 with the corresponding control endpoint 18 (Step 120h). The broker module then determines whether additional analysis by the AIS engine is requested or necessary (Step 120i). If so, the broker module 62 sends the data to the AIS engine 68 for analysis (Step 120j). After analysis, the analysis is provided to the bridge module 64 and the bridge module 64 transmits the analysis, video data, and drone 30 control data to the control endpoint 18 (Step 120k). At step 120i, if additional analysis by the AIS engine 68 is not requested or necessary, the bridge module 64 transmits the drone 30 video data and drone 30 control data to the control endpoint 18.

Figures 8A, 8B:
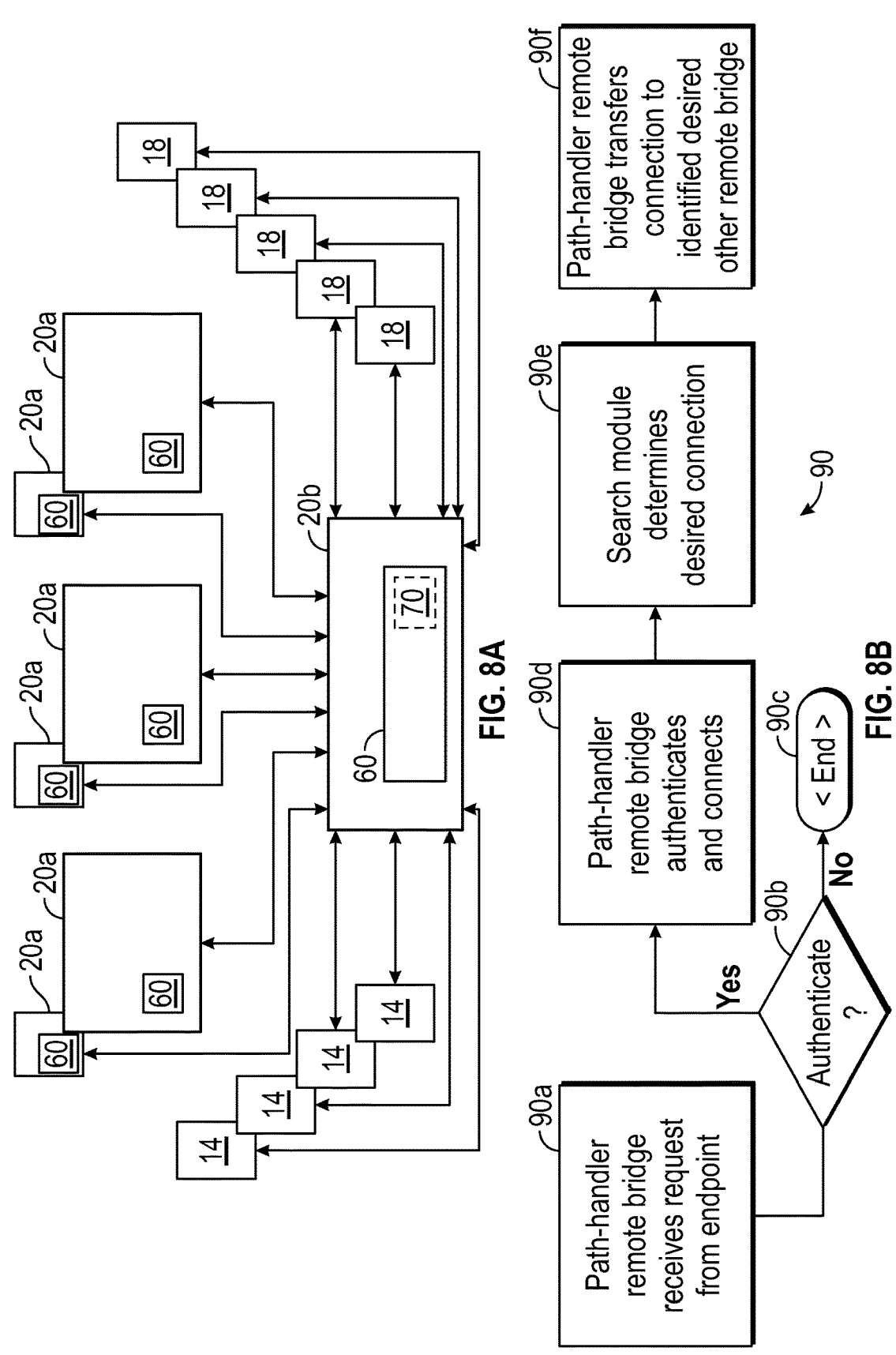
FIG. 8A is an example schematic view of a portion of an example remote drone piloting system including multiple remote bridges, pilot endpoints, and control endpoints.
FIG. 8B is an example process for determining which of multiple remote bridges should serve as the remote bridge between a particular pilot endpoint and control endpoint.

Referring to FIG. 8A-8B, with continued reference to FIGS. 1-7, in some examples, the system 10 includes multiple remote bridges 20a each with a server 60 and a designated path-handler remote bridge 20b. In this example, the multiple remote bridges 20a are located in different geographical locations.

FIG. 8B illustrates an example flow chart 90 determining which of the multiple remote bridges 20a the designated path-handler remote bridge 20b will designate to serve as the desired remote bridge 20 between a particular pilot endpoint 14 and control endpoint 18. The process can be utilized with any of the systems described herein and executed on the server 60 of path-handler remote bridge. The server 60 is programmed with logic or otherwise configured to execute the process 90. When a control endpoint 18 seeks to communicate with a pilot endpoint 14, or vice versa, the respective endpoint 14, 18 first attempts to communicate are routed through path-handler remote bridge 20b (Step 90a). Server 60 of path-handler remote bridge 20b includes a search module 70 that operates to determine which of multiple remote bridges 20*a* to route the request through. The path-handler remote bridge 20*b* will determine whether to authenticate and connect the respective control endpoint 18 and pilot endpoint 14 (Step 90*b*). If the path-handler remote bridge 20*b* does not authenticate the connection, the path-handler remote bridge 20*b* will end the process and await a new request (Step 90*c*). If the path-handler remote bridge 20*b* authenticates the request, the respective control endpoint 18 and pilot endpoint 14 are connected (Step 90*d*) and the search module 70 seeks to move the connection to another remote bridge 20*a* to balance loads on all of the remote bridges 20*a*, 20*b* and determine which remote bridge 20*a* will provide the most efficient and desired connection (Step 90*e*). Step 90*e* contemplates the search module 70 determines the desired path based on a number of factors. In some examples, the search module 70 will determine the remote bridge 20*a* to which to route the request based on one or more of the following factors: shortest latency between the control endpoint 18 and the pilot endpoint 14; shortest physical distance between the control endpoint 18 and the pilot endpoint 14; geographical proximity to the control endpoint 18 or the pilot endpoint 14; testing connection between the connections of each of the control endpoint 18 and the pilot endpoint 14 and a respective remote bridge 20*a*; current status and loads on the servers of each remote bridge 20*a*; and/or current speed and response of each remote bridge 20*a*. In some examples, the search module 70 may include a specific definition of the desired path based on the above factors, or based on a pre-set definition provided for by a user. Once the search module determines the desired remote bridge 20*a*, the connection between respective control endpoint 18 and pilot endpoint 14 are transferred to that remote bridge 20*a* (Step 90*f*).

With continued reference to FIGS. 1-8B, the drone remote pilot system 10 including some or all of the features described herein provides for remote piloting and control of a drone 30 through low connection latency via the remote bridge 20. In some examples, the range of acceptable latency is about or under 200 milliseconds (ms) for reporting data from or viewing the drone 30 in real-time. In some examples, the range of acceptable latency is about or under 150 ms for controlling the drone 30 in real-time. In some examples, the latency for the drone remote pilot system 10 is about 100 ms or less. In some examples, when the pilot endpoint 14, control endpoint 18, and remote bridge 20 are on the same continent, the latency is about 50 ms or less. Higher latencies may lead to errors, failures, and/or crashes that can reduce the effectiveness of remote pilot. The control endpoint 18 and pilot endpoint 14 provide signal latency measures to the remote bridge 20 to determine whether the latency is acceptable providing a connection allowing the pilot at the pilot endpoint 14 to control the drone 30.

Non-limiting, exemplary uses of the drone remote pilot system 10 including some or all of the features described herein include training new pilots remotely, conducting inspections of facilities, locations, or items remotely; supporting various maintenance or manufacturing operations remotely; and/or providing support to, or use by, law enforcement to operate drones 30 remotely and support ground operations or search locations without being physically present.

The foregoing description of the examples or embodiments has been provided for purposes of illustration and description. It is not intended to be exhaustive or to limit the disclosure. Individual elements or features of a particular example or embodiment are generally not limited to that particular example or embodiment, but, where applicable, are interchangeable and can be used in a selected example or embodiment, even if not specifically shown or described. Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A remote drone pilot system comprising:
   a pilot endpoint system comprising a pilot endpoint and a controller connected to the pilot endpoint;
   a control endpoint system comprising a control endpoint, a signal adaptor connected to the control endpoint and configured to convert between a drone communication protocol and an internet protocol, and a transmitter connected to the signal adaptor;
   a remote bridge, including a server; and
   a drone,
   wherein:
   the drone is configured to communicate with the transmitter of the control endpoint system to receive and send drone operating data to the control endpoint system and to communicate drone video data to the control endpoint system,
   the pilot endpoint is configured to communicate with the control endpoint only through the remote bridge such that no direct communication path exists between the pilot endpoint and the control endpoint that bypasses the remote bridge,
   the remote bridge is configured to pass all communications between the pilot endpoint and the control endpoint using the internet protocol, thereby allowing the drone operating data and drone video data to be communicated amongst the pilot endpoint, the control endpoint, and the drone in real-time, and
   the remote bridge further includes an artificial intelligence system engine hosted on the server and arranged to conduct real-time analysis on the drone video data and the drone operating data.

2. The remote drone pilot system of claim 1, wherein the remote bridge includes a broker module arranged to authenticate a connection between the remote bridge and each of the control endpoint and a remote endpoint.

3. The remote drone pilot system of claim 1, wherein the controller includes a joystick, wherein each of the pilot endpoint and the control endpoint comprise a graphical user interface configured to display the drone video data and at least some of the drone operating data.

4. The remote drone pilot system of claim 1, wherein the drone includes a camera, wherein the drone video data from the drone is arranged to be communicated to a video device on the signal adaptor.

5. The remote drone pilot system of claim 1, wherein the pilot endpoint system further includes an audio device, wherein the audio device is connected to the pilot endpoint such that commands can be input into the pilot endpoint verbally via the audio device.

6. The remote drone pilot system of claim 1, wherein the pilot endpoint comprises a plurality of pilot endpoints, wherein a first of the plurality of pilot endpoints is arranged to provide commands to control the drone, wherein a second of the plurality of pilot endpoints is configured to only view the drone video data and the drone operating data, wherein the drone video data and the drone operating data is displayed identically on a graphical user interface display on each of the first and second of the plurality of pilot endpoints.

7. The remote drone pilot system of claim 1, wherein the signal adaptor is connected to the control endpoint by a first USB connection and the controller is connected to the pilot endpoint by a second USB connection.

8. The remote drone pilot system of claim 1, wherein the drone, the remote bridge, the control endpoint system, and the pilot endpoint system are arranged to operate with a connection latency of about or less than 150 ms.

9. The remote drone pilot system of claim 1, wherein the drone, the remote bridge, the control endpoint system, and the pilot endpoint system are arranged to operate with a connection latency of between about 100 ms and about 150 ms.

10. A method of remotely piloting a drone, the method comprising:

(a) connecting a pilot endpoint located in first geographic area to a control endpoint located in a second geographic area through a remote bridge, wherein the pilot endpoint, the control endpoint, and the remote bridge connect using an internet protocol, and wherein no direct communication path exists between the pilot endpoint and the control endpoint that bypasses the remote bridge;

(b) communicating a command from the pilot endpoint to the control endpoint through the remote bridge;

(c) communicating the command from the control endpoint through a signal adaptor to a transmitter;

(d) communicating the command from the transmitter to the drone such that the drone is operated based on the command;

(e) communicating drone operating data from the drone to the signal adaptor through the transmitter;

(f) converting the drone operating data into a form readable by the control endpoint;

(g) communicating drone video data from the drone to the signal adaptor;

(h) communicating the converted drone operating data and the drone video data to the control endpoint, and then to the pilot endpoint through the remote bridge;

(i) displaying the drone video data and the converted drone operating data on the pilot endpoint;

(j) providing the drone video data to an artificial intelligence system engine of a server of the remote bridge;

(k) the artificial intelligence system engine conducting a real-time analysis on the drone video data to identify at least one of a number of objects viewed, a frequency of objects viewed, or a particular targeted object; and (l) communicating the real-time analysis to at least one of the pilot endpoint or the control endpoint, wherein steps (b)-(i) occur with a connection latency of about or less than 150 ms.

11. The method of claim 10, wherein connecting the pilot endpoint to the control endpoint through the remote bridge includes authenticating the pilot endpoint and the control endpoint using a broker module of the server of the remote bridge.

12. The method of claim 10, wherein the remote bridge is a first remote bridge, and wherein the server includes a search module, and further comprising:

determining using the search module a desirable second remote bridge from a plurality of second remote bridges; and transferring the control endpoint and the pilot endpoint to be connected through the desirable second remote bridge.

13. The method of claim 12, wherein the search module determines the desirable second remote bridge based on one or more of shortest latency between the control endpoint and the pilot endpoint, shortest physical distance between the control endpoint and the pilot endpoint, or geographical proximity to the control endpoint or the pilot endpoint.

14. The method of claim 10, wherein conducting the real-time analysis further includes classifying the at least one of the number of objects viewed, the frequency of objects viewed, or the particular targeted object to detect a component, sub-assembly, or system on the drone video data and create a report of a classification.

15. The method of claim 10, further comprising transmitting the command verbally to the pilot endpoint using an audio device including a microphone.

16. The method of claim 10, wherein the pilot endpoint is a first pilot endpoint, and further comprising connecting a second pilot endpoint to the control endpoint, wherein the first pilot endpoint communicates commands to pilot the drone and the second pilot endpoint communicates commands to control operation of a camera on the drone providing the drone video data.

17. The method of claim 10, further comprising:

multiplexing the drone video data communicated from the control endpoint using the remote bridge; and displaying the multiplexed drone video data on a graphical user interface of each of a plurality of additional pilot endpoints.

18. The method of claim 10, wherein the drone is an unmanned aerial vehicle.

* * * * *